US010846475B2

(12) United States Patent
Zhang et al.

(10) Patent No.: US 10,846,475 B2
(45) Date of Patent: Nov. 24, 2020

(54) EMOJI INPUT METHOD AND DEVICE THEREOF

(71) Applicant: Beijing Xinmei Hutong Technology Co.,Ltd, Beijing (CN)

(72) Inventors: Datao Zhang, Beijing (CN); Sai Zhang, Beijing (CN)

(73) Assignee: BEIJING XINMEI HUTONG TECHNOLOGY CO., LTD., Beijing (CN)

( * ) Notice: Subject to any disclaimer, the term of this patent is extended or adjusted under 35 U.S.C. 154(b) by 8 days.

(21) Appl. No.: 15/239,462

(22) Filed: Aug. 17, 2016

(65) Prior Publication Data

US 2017/0185580 A1    Jun. 29, 2017

(30) Foreign Application Priority Data

Dec. 23, 2015    (CN) ............................ 2015-30553724
Jul. 19, 2016    (CN) ............................ 2016-10575645

(51) Int. Cl.
*G06F 17/00* (2019.01)
*G06F 40/274* (2020.01)
*G06T 11/00* (2006.01)
*G06F 3/023* (2006.01)
*G06F 3/0484* (2013.01)

(52) U.S. Cl.
CPC .......... *G06F 40/274* (2020.01); *G06F 3/0237* (2013.01); *G06F 3/04842* (2013.01); *G06T 11/00* (2013.01)

(58) Field of Classification Search
CPC .............................. G06F 17/276; G06F 3/0482

USPC ................................ 715/256, 259, 207, 208
See application file for complete search history.

(56) References Cited

U.S. PATENT DOCUMENTS

| | | | |
|---|---|---|---|
| 9,547,425 B2 * | 1/2017 | Wilson ................ | G06F 3/04842 |
| 9,558,178 B2 * | 1/2017 | Muller .................... | G06F 17/28 |
| 9,588,966 B2 * | 3/2017 | Eck ........................ | G06F 17/28 |
| 9,690,767 B2 * | 6/2017 | Leydon ................ | G07F 17/3244 |
| 10,031,907 B2 * | 7/2018 | Bell ....................... | G06F 17/276 |
| 10,311,144 B2 * | 6/2019 | Bellegarda .............. | G06F 40/30 |
| 10,445,425 B2 * | 10/2019 | Jon ........................ | G06F 40/274 |
| 10,530,723 B2 * | 1/2020 | Milligan ................ | H04L 51/02 |
| 2010/0088616 A1 * | 4/2010 | Park ........................ | H04L 51/04 |
| | | | 715/762 |
| 2011/0234504 A1 * | 9/2011 | Barnett ................. | G06F 3/0482 |
| | | | 345/173 |
| 2013/0222238 A1 * | 8/2013 | Sliger ................... | G06F 3/0484 |
| | | | 345/157 |
| 2013/0346400 A1 * | 12/2013 | Ramsey ............ | G06F 17/30864 |
| | | | 707/723 |
| 2015/0100537 A1 * | 4/2015 | Grieves ................. | G06N 5/048 |
| | | | 706/52 |
| 2016/0142358 A1 * | 5/2016 | Zunger .................. | G06Q 50/01 |
| | | | 709/206 |

(Continued)

*Primary Examiner* — Stephen S Hong
*Assistant Examiner* — Matthew J Ludwig
(74) *Attorney, Agent, or Firm* — Anova Law Group, PLLC

(57) ABSTRACT

The present disclosure describes an emoji input method and a device thereof. The emoji input method may include: detecting a user operation that starts an emoji conversion function; receiving a plurality of user input words; segmenting the plurality of user input words to obtain a keyword candidate; searching for an emoji corresponding to the keyword candidate based on a mapping relationship between the keyword and emojis; and displaying the emoji.

11 Claims, 6 Drawing Sheets

(56) References Cited

U.S. PATENT DOCUMENTS

| | | | |
|---|---|---|---|
| 2017/0083174 A1* | 3/2017 | Tobens, III | G06F 3/0482 |
| 2017/0134819 A9* | 5/2017 | Mohamed | H04N 21/4828 |
| 2017/0161238 A1* | 6/2017 | Fang | G06F 17/2235 |
| 2017/0177554 A1* | 6/2017 | Emmons | H04L 51/04 |
| 2017/0185581 A1* | 6/2017 | Bojja | G06F 17/24 |
| 2018/0373683 A1* | 12/2018 | Hullette | G06Q 50/01 |

* cited by examiner

EMOJI INPUT METHOD AND DEVICE THEREOF

CROSS-REFERENCES TO RELATED APPLICATIONS

This application claims the priority of Chinese patent application No. 201610575645.7, filed on Jul. 19, 2016, and claims the priority of Chinese patent application No. 201530553724.4, filed on Dec. 23, 2015, the entire content of the two applications is incorporated herein by reference.

FIELD OF THE INVENTION

The present invention generally relates to the field of information input technology and, more particularly, to an emoji input method and device thereof.

BACKGROUND

Emoticons, also known as emojis, are a type of symbols that vividly represent human emotions. The Unicode Consortium encodes a list of emoji characters. And operational systems like Google, Apple, and Microsoft often add emoji provided by the Unicode Consortium to their own systems. When using applications like the document editor and instant message, a user often inserts an emoji as a vivid and interesting way to express his or her emotion, mood, or attitude. However, the emoji input method in current technologies still have at least one drawback: when a user enters normal input, emojis often pop up and interrupt the normal information input by the user. The disclosed emoji input method and device thereof are directed to at least partially solve the problem set forth above and other problems.

BRIEF SUMMARY OF THE DISCLOSURE

One aspect of the present disclosure provides a method for inputting and displaying emojis. The method for inputting and displaying emojis includes: detecting a user operation that starts an emoji conversion function; receiving a plurality of user input words; segmenting the plurality of user input words to obtain a keyword candidate; searching for an emoji corresponding to the keyword candidate based on a mapping relationship between the keyword and emojis; and displaying the emoji.

Another aspect of the present disclosure provides a device for inputting and displaying emojis. The device for inputting and displaying emojis includes a conversion detection module, a word segmentation module, and a conversion input module. The conversion detection module is configured to detect a user operation that starts an emoji conversion function. The word segmentation module is configured to receive user input words and execute word segmentation to obtain keyword candidates. The conversion input module is configured to input emojis corresponding to at least partial keyword candidates based on the mapping relationship between the keywords and emojis.

Another aspect of the present disclosure provides an apparatus for inputting and displaying emojis with one or more processors and computer instructions stored on computer readable media, when executed by the one or more processors, the computer instructions perform a method for inputting and displaying emojis. The method for inputting and displaying emojis includes: detecting a user operation that starts an emoji conversion function; receiving a plurality of user input words; segmenting the plurality of user input words to obtain a keyword candidate; searching for an emoji corresponding to the keyword candidate based on a mapping relationship between the keyword and emojis; and displaying the emoji.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

Often, there are often two methods to input emojis: a user may browse over a list of emoji characters and select a specific emoji to insert; or, when a user types in words in a certain language, the input method searches through the emoji mapping table in real-time to find a matched emoji, and then pops up the emoji for the user. However, when a user types in words, emojis often pop up, thus interrupting the information input process performed by the user. The disclosed emoji input method and device thereof are directed to at least partially solve the problem set forth above and other problems.

The present disclosure provides an improved emoji input device and method thereof. The disclosed emoji input device and method thereof may not only solve the problem that emojis often pop up when a user types in words, but may also improve the input efficiency of a user by detecting a user operation that starts an emoji conversion function and later converting input words to emojis when necessary.

Figure 1:
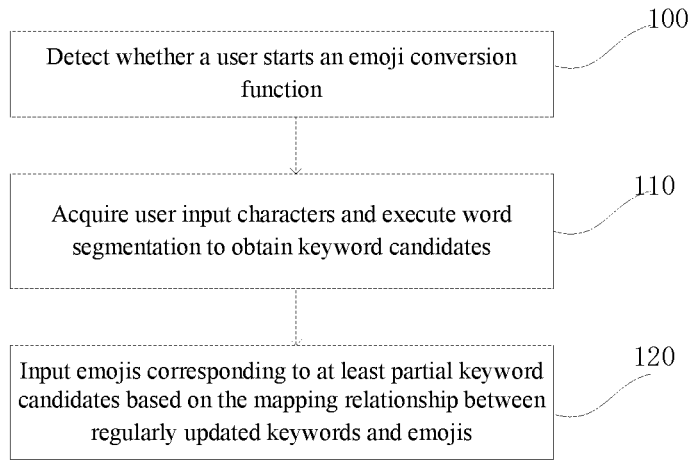
FIG. 1 illustrates a flow chart corresponding to an emoji input method consistent with disclosed embodiments.

FIG. 1 illustrates a flow chart corresponding to an emoji input method. As shown in FIG. 1, the emoji input method may include an operation that detects whether a user starts an emoji conversion function (step 100).

Specifically, a control, such as a switch button or an icon for the emoji conversion function may be designed in a graphical user interface that shows input emojis. A conversion detection module may be configured to determine whether the user has triggered the present control to start the emoji conversion function. Further, by calling an interface of an operation system or registering a touch monitor event of the operation system, whether the user starts the emoji conversion function may be detected.

The emoji input method may also include an operation that acquires user input words and executes word segmentation to obtain keyword candidates (step 110). In the present disclosure, a keyword may refer to a word that is frequently used, a word with specific meanings, or a word with certain attributes.

Specifically, the interface of the operation system may be called to acquire the user input words. Further, by calling the built-in interface of an operation system, the acquired user input words may undergo word segmentation to obtain at least one word entry. Each word entry may be a keyword candidate used to match an emoji.

The emoji input method may further include an operation that inputs emojis corresponding to at least partial keyword candidates based on the mapping relationship between regularly updated keywords and emojis (step 120).

Specifically, an electronic device may have a local keyword list. The keywords in the list may be popular vocabulary used in a preset period of time, namely, vocabulary with a relatively high input frequency. The keywords may be obtained by performing big data analysis of chatting records and online articles. The locally stored keywords in the electronic device may be regularly updated via a server. An electronic device or a server may also preset the mapping relationship between keywords and emojis. One keyword may corresponds to one more emojis. One emoji may correspond to one or more keywords. Often, the electronic device may temporarily store and regularly maintain the mapping relationship between keywords and emojis. For example, the electronic device may delete, empty, add or update the mapping relationship between keywords and emojis. In operation, the electronic device may regularly update the mapping relationship between the cached keywords and emojis via the server.

Keyword candidates may be obtained by segmenting user input words, and each keyword candidate may be matched in the preset keyword list, respectively. If the matching is successful, namely, a specific keyword is included in the keyword list, then the keyword may be converted to an emoji; if the matching is unsuccessful, namely, the specific keyword is not included in the keyword list, then the keyword may not be converted to an emoji for future input. After the keywords that may be converted to an emoji are determined, the keywords determined from user input words may be converted to emojis for input.

Figure 2:
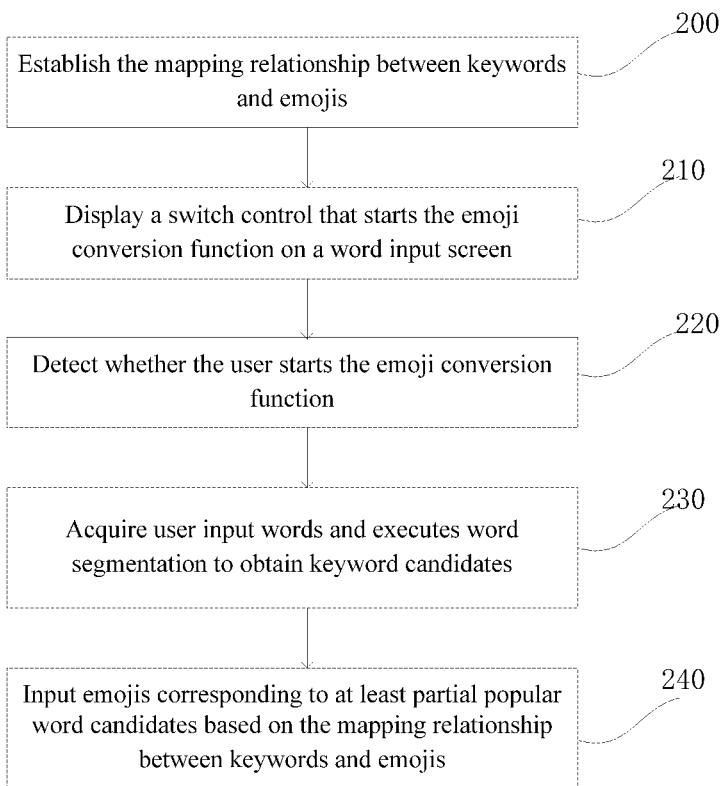
FIG. 2 illustrates a flow chart corresponding to another emoji input method consistent with disclosed embodiments.

FIG. 2 illustrates a flow chart corresponding to another emoji input method consistent with embodiments of the present disclosure. As shown in FIG. 2, the emoji input method may include an operation that establishes the mapping relationship between keywords and emojis (Step 200).

Specifically, the keywords may be obtained by performing big data analysis of chatting records and online articles. First, the electronic device may request a keyword list from the server and locally store the keyword list. Every time when an electronic device starts or an application for inputting emoji launches in the electronic device, the electronic device may request the latest keyword list from the server, and regularly update the locally saved keywords in the electronic device. Meanwhile, the electronic device or the server may preset the mapping relationship between keywords and emojis. Often, the electronic device may temporarily save and regularly maintain the mapping relationship between keywords and emojis. For example, the electronic device or a user using the electronic device may delete, empty, add or update the mapping relationships between keywords and emojis. In operation, the electronic device may regularly update the mapping relationship between cached keywords and emojis via the server. The user may also add more keywords through the electronic device and simultaneously add the corresponding emojis.

In some embodiments, the emoji input application may map keywords and emojis based on the attributes of the emojis and the keywords. For example, a key work "smile" may be mapped to an emoji showing a smile based on the meaning of the emoji and the keywords. In some embodiments, the emoji input application may maintain a number of different mappings between the keywords and emojis. For example, a key work "smile" may be associated with emoji A in a first set of mappings and may be associated with emoji B in a second set of mappings. The first set or second set of mappings may use emojis with certain characteristics, such as emojis of a certain color, or of a certain cartoon character, etc. When a user selects the emoji to be used in subsequent steps, the user may first select which set of emoji mappings to use and then select the specific emoji to be used.

The emoji input method may also include displaying a switch control that starts emoji conversion function on a word input screen (Step 210). For example, the control may be a switch button or an icon that starts emoji conversion function on the input method interface.

The emoji input method may also include an operation that detects whether the user starts the emoji conversion function (step 220). Specifically, the disclosed operation may include detecting a trigger action by the user on the preset control that starts the emoji conversion function. In operation, during the process that the user inputs words via a word input interface, whether the emoji conversion function is started or not may be determined by detecting the trigger action by the user on the preset control. By calling the interface of an operation system or registering a touch monitor event, the user operation that starts the emoji conversion function may be detected. For example, when a click on the switch that controls the emoji conversion function is detected, the current status of the switch may be obtained, and if the current status shows disabled emoji conversion function, the emoji conversion function may be started.

The emoji input method may also include an operation that acquires user input words and executes word segmentation to obtain keyword candidates (step 230).

Specifically, the interface of the operation system may be called to acquire the user input words. Further, by calling the built-in interface of an operation system, the acquired user input words may undergo word segmentation to obtain at least one word entry. Each entry may be a keyword candidate used to match an emoji. In operation, the built-in word analysis system in an Android or IOS operation system may be applied to execute word segmentation for user input words to obtain keyword candidates. For example, acquired user input words "I love star" may be segmented into three entries of "I", "love", "star" by calling the interface provided by the operation system, and the three entries of "I", "love", "star" may be selected as keyword candidates.

The emoji input method may further include an operation that inputs emojis corresponding to at least partial keyword candidates based on the mapping relationship between keywords and emojis (step 240).

Keyword candidates may be obtained by segmenting user input words, and each keyword candidate may be matched with words in the preset keyword list, respectively. If the matching is successful, namely, the specific keyword is included in the keyword list, then the keyword may be converted to an emoji; if the matching is unsuccessful, namely, the specific keyword is not included in the keyword list, then the keyword may not be converted to an emoji for future input. After the keywords that may be converted to an emoji are determined, the keywords determined from user input words may be converted to emojis for input.

In operation, based on the mapping relationship between keywords and emojis, there may be two conditions when inputting emojis corresponding to at least partial keyword candidates. Still, the three keyword candidates "I", "love", "star" may be used to illustrate the specific process of inputting emojis corresponding to at least partial keyword candidates based on the mapping relationship between regularly updated keywords and emojis.

In the first condition, the specific process of inputting emojis corresponding to at least partial keyword candidates may include determining the emojis corresponding to the disclosed keyword candidates based on the mapping relationship between regularly updated keywords and emojis. Further, for keyword candidates with more than one corresponding emojis, the keyword candidates may be highlighted. Based on the highlighted keyword candidates selected by the user, a list of emojis corresponding to the keyword candidates may be displayed. Further, based on the list selected by the user, the keyword candidates selected by the user may be replaced with user selected emojis from the list.

Each keyword candidate may be matched in the preset and regularly updated keyword list. For example, if a keyword "love" exists in the keyword list, then the successfully matched keyword candidate may be "love". For the successfully matched keyword candidate "love", the emoji corresponding to "love" may be determined based on the mapping relationship between regularly updated keywords and emojis. Assume there are two emojis corresponding to the keyword "love", the input keyword candidate "love" may be highlighted. In operation, displaying methods like highlighting, box-in, underline and bolding may be applied to clearly show the keyword candidates with more than one corresponding emojis.

Figure 3:
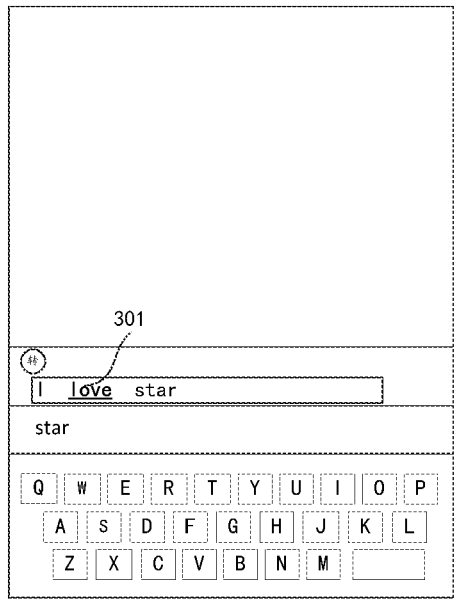
FIG. 3 illustrates a screen displaying a keyword having a corresponding emoji consistent with disclosed embodiments.

For example, FIG. 3 illustrates a screen displaying the keyword candidate 301 "love" with corresponding emojis. As shown in FIG. 3, based on the mapping relationship between regularly updated keywords and emojis, more than one emoji corresponding to the keyword candidate 301 "love" may be determined, accordingly, the keyword candidate 301 "love" may be underlined.

Figure 4:
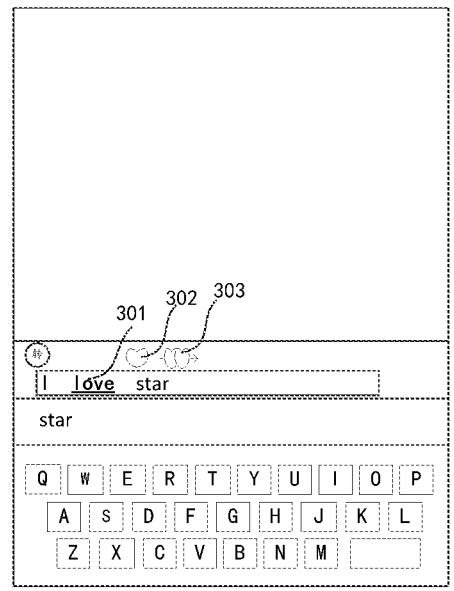
FIG. 4 illustrates a screen displaying a keyword having multiple corresponding emojis consistent with disclosed embodiments.
Figure 5:
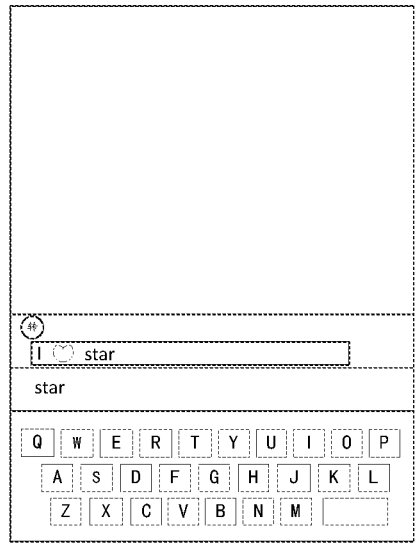
FIG. 5 illustrates a screen where a word is replaced with an emoji consistent with disclosed embodiments.

Later, a user click on a word input interface may be detected. When a click on a highlighted keyword candidate is detected, the keyword candidate selected by the user may be determined, and simultaneously, a list of emojis corresponding to the highlighted keyword candidates may be displayed in a preset location within the word input interface, as shown in FIG. 4. Specifically, in FIG. 4, the highlighted keyword candidate is 301 "love", and emojis corresponding to 301 "love" may be an emoji 302 or an emoji 303. Further, based on the user click on an emoji 302 or an emoji 303 from the emoji list, one emoji corresponding to the keyword candidate 301 "love" may be selected to replace the keyword candidate 301 "love". If the user clicks on the emoji 302, the emoji 302 may replace the keyword candidate 301 "love", and the user input information with the keyword candidate "love" being replaced is illustrated in FIG. 5.

In the second condition, the specific process of inputting emojis corresponding to at least partial keyword candidates may include determining the emojis corresponding to the keyword candidates based on the mapping relationship between the regularly updated keywords and emojis. Further, for keyword candidates with one or less than one corresponding emoji, the keyword candidates may be replaced with the emoji corresponding to the keyword candidates.

Figure 6:
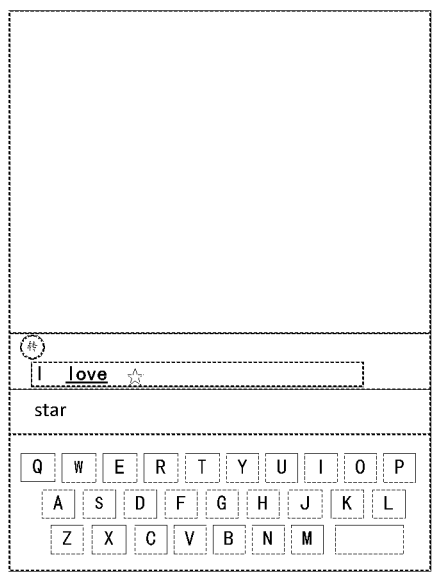
FIG. 6 illustrates a screen where another word is replaced with an emoji consistent with disclosed embodiments.

Each keyword candidate may be matched in the preset and regularly updated keyword list. For example, if a keyword "star" exists in the keyword list, then the successfully matched keyword candidate may be "star". For the successfully matched keyword candidate "star", the emoji corresponding to "star" may be determined based on the mapping relationship between regularly updated keywords and emojis. Assume there is only one emoji corresponding to the keyword "star", the keyword "star" may be replaced with the corresponding emoji, and the user input information with the keyword candidate "star" being replaced is illustrated in FIG. 6.

The emoji may be an image with a unique code. The server may save the image corresponding to the emoji, and each emoji may have a unique code. When the input interface displays the user input emoji, the electronic device may acquire the attribute of an emoji from the server according to the code of the emoji. The attribute of the emoji may at least include the image link of the emoji. Further, based on the image link of the acquired emoji, the image data of the emoji may be read and displayed. The emoji may be saved in a form of image, thus showing a better platform flexibility in a word-storing library compared to existing technologies. For example, the emojis with the same code may have the same displaying effects in different operation systems.

The mapping relationship between keywords and emojis may be stored locally in the electronic device, or may be stored in the server. Often, the electronic device may temporarily save the mapping relationship between keywords and emojis, and when the electronic device launches, or when the word input software launches, or at other moment, the electronic device may request the mapping relationship between updated keywords and emojis from the server to update the local mapping relationship. Via the mapping relationship between the locally cached keywords and emojis, the input of emojis may also be realized when the internet connection is not smooth or when there is no internet connection, thus saving the internet dataflow. By regularly updating the mapping relationship between the locally-cached keywords in the electronic device and the emojis, embodiments of the present disclosure maintain the diversity and novelty of the emojis, and improve the user experience.

Figure 7:
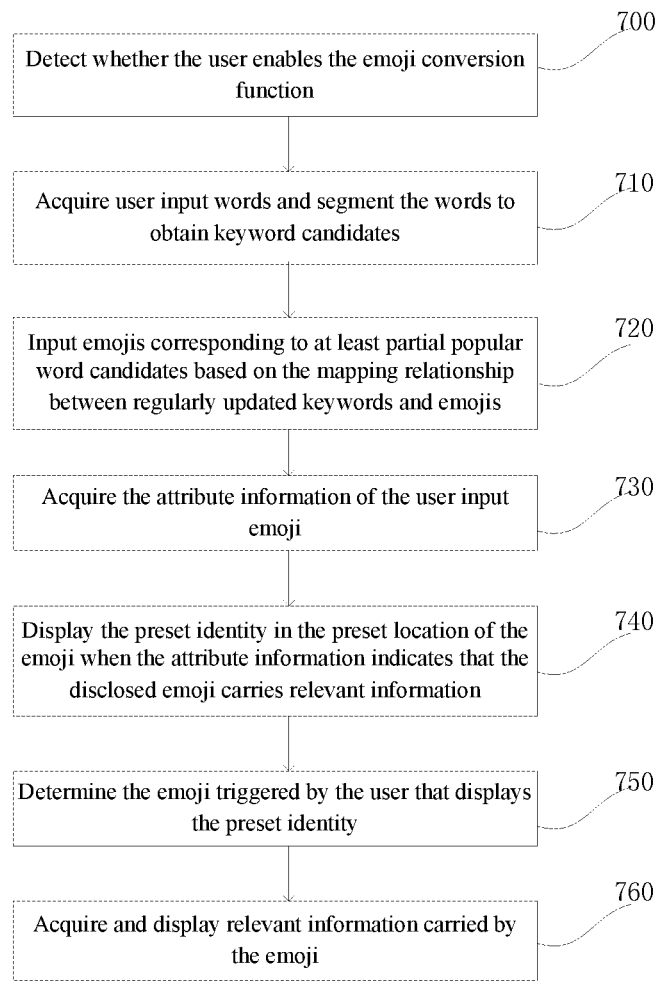
FIG. 7 illustrates a flow chart corresponding to another emoji input method consistent with disclosed embodiments.

FIG. 7 illustrates a flow chart corresponding to an emoji input method consistent with the present disclosure. As shown in FIG. 7, the emoji input method may include an operation that detects whether the user starts the emoji conversion function (step 700). The emoji input method may also include an operation that acquires user input words and segments the words to obtain keyword candidates (step 710).

Further, the emoji input method may include an operation that inputs emojis corresponding to at least partial keyword candidates based on the mapping relationship between regularly updated keywords and emojis (step 720).

After an operation that inputs emojis corresponding to at least partial keyword candidates based on the mapping relationship between regularly updated keywords and emojis, the emoji input method may also include obtaining the attribute information of the user input emojis. When the attribute information indicates that the disclosed emoji carries relevant information, the preset location of the emoji may display a preset identity.

The emoji input method may include obtaining the attribute information of the user input emoji (step 730). For example, in the process of word input in an instant messaging software, after obtaining the user input information that contains regular words and emojis, the instant messaging software may confirm the codes of the emojis contained in the input information, send the codes of the emojis to the server, and request the attribute information of the emojis from the server.

The server may store an emoji code list. The code list may include codes of emojis and attribute information of each emoji. The attribute information of an emoji may include a download link of the emoji, whether the emoji carries an identity with relevant information, and a link to relevant information. The link to the relevant information may be an Uniform Resource Locator (URL), or a memory address on the server. The link to the relevant information on the server may be the memory address or the uniform resource locator of the relevant information pre-searched or provided by the server according to the keyword corresponding to each emoji.

In one embodiment, the attribute information of an emoji may also include the keyword corresponding to the emoji. The instant messaging software in the electronic device may acquire the attribute information of the emoji and search relevant information in a communication log according to a specific keyword, or a phase consists of the specific keyword and ordinary symbols adjacent to the emoji, or the code of the emoji. The link to the searched relevant information may be used as the link to relevant information.

The emoji input method may include displaying the preset identity in the preset location of the emoji when the attribute information indicates that the disclosed emoji carries relevant information (step 740).

Figure 8:
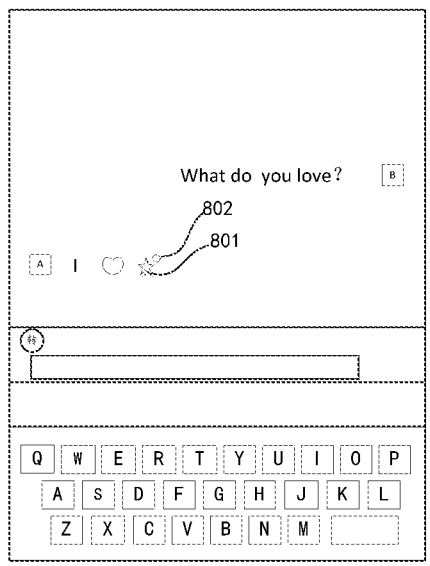
FIG. 8 illustrates a screen displaying an emoji with pre-set identity.

For the acquired attribute information of the user input emoji, first, the image download link of the emoji may be read, and the image data of the emoji may be downloaded via the download link and displayed. Further, whether the emoji carries an identity of relevant information may be determined according to whether the attribute information carries an identity of relevant information. If the emoji carries an identity of relevant information, the preset location of the emoji may display a preset identity. In operation, the preset location may be at the top right corner, the top left corner, or the lower right corner, and the preset identity may be an underline, a circle, or a color lump. FIG. 8 illustrates a screen displaying an emoji with a preset identity. As shown in FIG. 8, a circle 802 at the top right corner of an emoji 801 may indicate that the emoji 801 carries relevant information. By triggering the emoji 801, relevant information of the emoji 801 may be further reviewed.

When the attribute information indicates that the disclosed emoji carries relevant information, the method after displaying the preset identity in the preset location of the emoji may include determining the emoji displayed with a preset identity triggered by the user, and obtaining and displaying relevant information carried by the emoji.

The emoji input method may include determining the emoji triggered by the user that displays the preset identity (step 750). After the instant messaging software displays the user input information, the method may detect a trigger operation by the user on the emoji with a preset identity from the user input information. For example, the method may detect a clicking operation by the user on the emoji 801.

Figure 9:
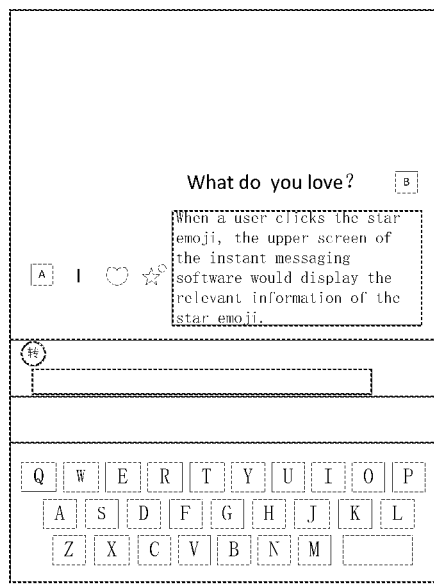
FIG. 9 illustrates a screen where an emoji with pre-set identity in FIG. 8 is triggered.

The emoji input method may include acquiring and displaying relevant information carried by the emoji (step 760). When the emoji with a preset identity triggered by the user is determined, the instant messaging software may acquire the link to the relevant information from the attribute information of the emoji 801. When the link to the relevant information is the memory address on the server or a local memory address, the instant messaging software may read relevant information from a designated address of the server, and create a child window or a floating window on top of a currently displayed window to display the relevant information read from the server, as illustrated in FIG. 9.

When the link to the relevant information is a URL, the instant messaging software may create a child window or a floating window on top of the currently displayed window, a browser software may be launched to read the page content of the URL and display the page content on the child window or the floating window.

Figure 10:
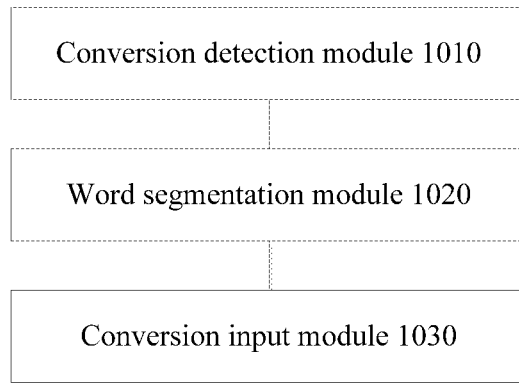
FIG. 10 illustrates a structure of an emoji input device.

FIG. 10 illustrates an emoji input device consistent with embodiments of the present disclosure. As shown in FIG. 10, the emoji input device may include a conversion detection module 1010, a word segmentation module 1020, and a conversion input module 1030. A module in the present disclosure refers to computer software and hardware components that can be configured to implement described functions. For example, a module may include computer instructions stored in a computer readable media and a processors. When the computer instructions are executed by the process, the module performs specific functions, such as detecting a user operation, or converting a keyword to an emoji. In one example, an emoji input device may be a smart phone or a laptop with software programs that, when executed by a processors, can implement the emoji input functions and tasks. Further, the emoji input device may include a keyboard and/or a touch screen for the user to enter input.

The conversion detection module 1010 may be used to detect whether the user starts the emoji conversion. The word segmentation module 1020 may be used to acquire user input words and execute word segmentation to obtain keyword candidates. The conversion input module 1030 may be used to input emojis corresponding to at least partial keyword candidates based on the mapping relationship between regularly updated keywords and emojis.

The emoji input device may detect whether a user starts the emoji conversion function, acquire user input words and execute word segmentation to obtain keyword candidates.

The emoji input device may input emojis corresponding to at least partial keyword candidates based on the mapping relationship between regularly updated keywords and emojis, which means when a user enters normal input, emojis would not pop up or interrupt the information input by the user. By the operation that detects whether the user starts the emoji conversion function, the user input words may be converted to emojis when the user prefer to input emoji, thus improving the input efficiency.

Figure 11:
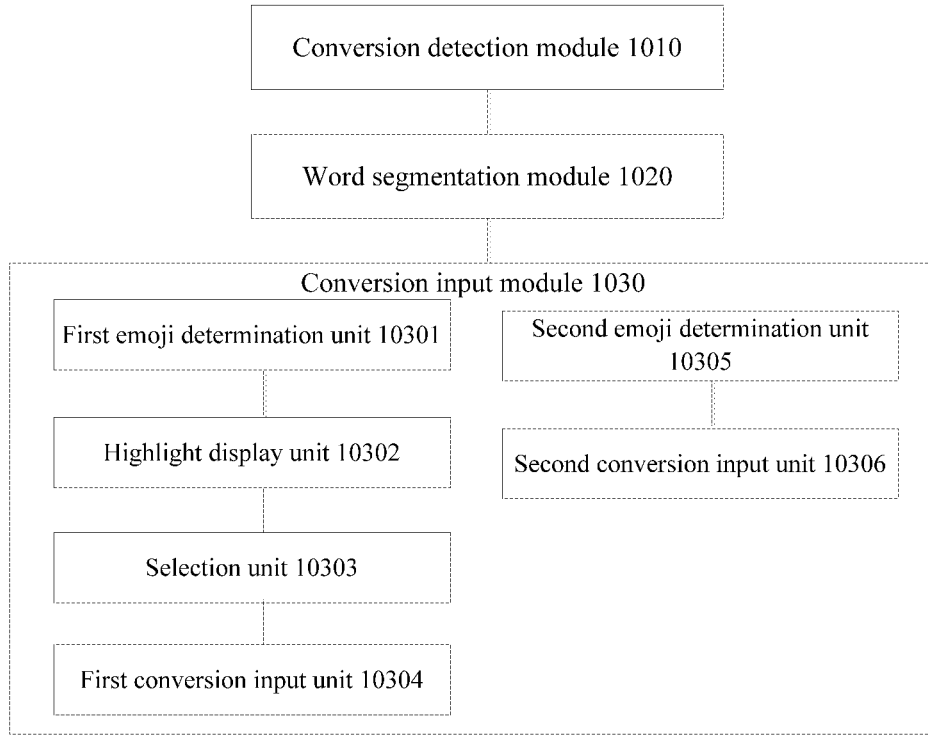
FIG. 11 illustrates another structure of an emoji input device.

Optionally, FIG. 11 illustrates another emoji input device. As shown in FIG. 11, the conversion input module 1030 may include a first emoji determination unit 10301, a highlight display unit 10302, a selection unit 10303, and a first conversion input unit 10304.

The first emoji determination unit 10301 may be used to determine the emoji corresponding to the keyword candidate based on the mapping relationship between the regularly updated keywords and emojis. The highlight display unit 10302 may be used to highlight the keyword candidate when there are more than one emoji corresponding to the keyword candidate. The selection unit 10303 may be used to display the emoji list corresponding to the keyword candidate based on the keyword candidate highlighted by the highlight display unit 10302. The first conversion input unit 10304 may be used to replace the user selected keyword candidate with the user selected emoji from the emoji list.

Optionally, the conversion input module 1030 may also include a second emoji determination unit 10305, and a second conversion input unit 10306. The second emoji determination unit 10305 may be used to determine the emoji corresponding to the keyword candidate based on the mapping relationship between the regularly updated keywords and emojis. The second conversion input unit 10306 may replace the keyword candidate with the emoji determined by the second emoji determination unit 10305 for a keyword candidate with one or less than one corresponding emoji.

In operation, the conversion detection module 1010 may specifically be used to detect the trigger action by the user on the preset control that starts the emoji conversion function. The emoji may be an image with a unique code.

Figure 12:
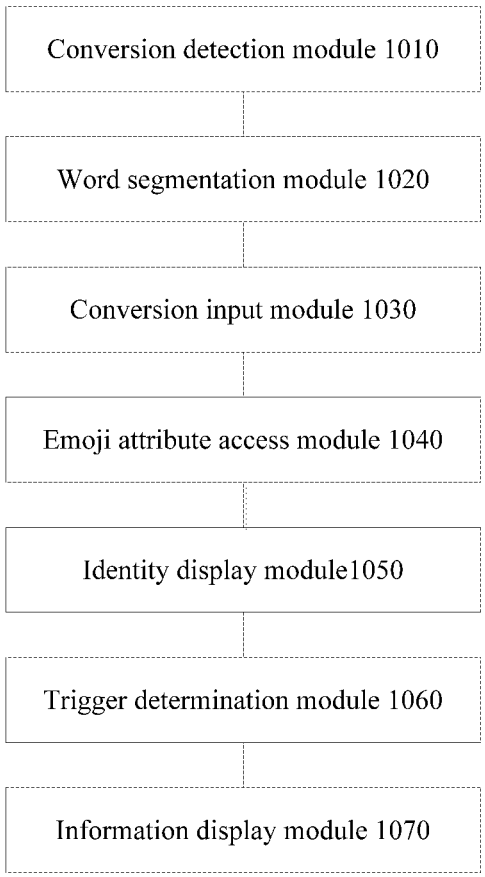
FIG. 12 illustrates another structure of an emoji input device.

FIG. 12 illustrates another emoji input device consistent with the embodiments of the present disclosure. As shown in FIG. 12, the emoji input device may include a conversion detection module 1010, a word segmentation module 1020, a conversion input module 1030, an emoji attribute access module 1040, and an identity display module 1050. The emoji attribute access module 1040 may be used to acquire the attribute information of the user input emoji. The identity display module 1050 may be used to display a preset identity in the preset location of the emoji when the attribute information of the emoji acquired by the emoji attribute access module 1040 carries relevant information.

Optionally, the emoji input device may also include a trigger determination module 1060 and an information display module 1070. The trigger determination module 1060 may be used to determine the emoji with a preset identity triggered by the user. The information display module 1070 may be used to obtain and display the relevant information carried by the emoji.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

The disclosed embodiments may be realized by use of software and a necessary hardware platform, or by use of hardware. Accordingly, the disclosed embodiment may take the form of a software product, and the software product may be stored in a computer-readable storage medium like ROM/RAM, a magnetic disc, or an optical disc. The software product may include a plurality of commands that enables a computer equipment (i.e., a personal computer, a server, or a network device) to execute the disclosed embodiment or method thereof.

What is claimed is:

1. A method for inputting and displaying emojis, comprising:
    performing a data analysis of chatting records and online articles to obtain keywords, and storing the keywords in a local keyword list to update a previous local keyword list;
    presetting at least one mapping between the keywords and emojis based on attributes of the keywords and the emojis;
    displaying a preset switch button for starting an emoji conversion function on an input method interface, wherein the switch button remains to be displayed at a fixed location within the input method interface;
    detecting a user operation on the switch button that starts the emoji conversion function;
    receiving a plurality of user input words;
    segmenting the plurality of user input words to obtain at least one keyword candidate;
    matching each keyword candidate of the at least one keyword candidate with the keywords stored in the local keyword list;
    searching for one or more emojis corresponding to one or more matched keyword candidates based on the at least one mapping between the keywords and the emojis;
    displaying, within a preset location of a first emoji, a preset identity to indicate that the first emoji includes a link to attribute information of the first emoji, the attribute information including a download link of the first emoji, wherein the one or more emojis of the searching include the first emoji; and
    displaying the attribute information of the first emoji in response to an operation on the first emoji.

2. The method according to claim 1, wherein:
    searching for the one or more emojis corresponding to the one or more matched keyword candidates based on the at least one mapping between the keywords and the emojis further comprises:
        selecting a mapping from the at least one mapping between the keywords and the emojis; and
        determining more than one emoji corresponding to one of the one or more matched keyword candidates based on the selected mapping; and
    the method further includes:
        highlighting the keyword candidate with the more than one corresponding emoji;
        in response to a first selection operation on the highlighted keyword candidate, displaying an emoji list corresponding to the highlighted keyword candidate, wherein the emoji list includes the more than one corresponding emoji; and in response to a second selection operation on an emoji from the emoji list, replacing the highlighted keyword candidate with the emoji selected from the emoji list.

3. The method according to claim 1, wherein:
searching for the one or more emojis corresponding to the one or more matched keyword candidates based on the at least one mapping between the keywords and the emojis further comprises: determining one emoji corresponding to one of the one or more matched keyword candidates based on the at least one mapping between the keywords and the emojis; and
the method further includes: replacing the keyword candidate with the determined emoji.

4. The method according to claim 1, wherein detecting the user operation that starts the emoji conversion function further comprises:
detecting a trigger action by the user on the switch button that starts the emoji conversion function.

5. The method according to claim 1, wherein displaying the attribute information of the first emoji in response to the operation on the first emoji includes:
acquiring the attribute information of the first emoji, wherein the link is a Uniform Resource Locator (URL), and the attribute information further includes a page content of the URL; and
displaying the page content.

6. The method according to claim 1, wherein the emoji is an image with a unique code.

7. An apparatus for inputting and displaying emojis with one or more processors and for storing computer instructions, when executed by the one or more processors, the computer instructions configuring the one or more processors for:
performing a data analysis of chatting records and online articles to obtain keywords, and storing the keywords in a local keyword list to update a previous local keyword list;
presetting at least one mapping between the keywords and the emojis based on attributes of the keywords and the emojis;
displaying a preset switch button for starting an emoji conversion function on an input method interface, wherein the switch button remains to be displayed at a fixed location within the input method interface;
detecting a user operation on the switch button that starts the emoji conversion function;
receiving a plurality of user input words;
segmenting the plurality of user input words to obtain at least one keyword candidate;
matching each keyword candidate of the at least one keyword candidate with the keywords stored in the local keyword list;
searching for one or more emojis corresponding to one or more matched keyword candidates based on the at least one mapping between the keywords and the emojis;
displaying, within a preset location of a first emoji, a preset identity to indicate that the first emoji includes a link to attribute information of the first emoji, the attribute information including a download link of the first emoji, wherein the one or more emojis of the searching include the first emoji; and
displaying the attribute information of the first emoji in response to an operation on the first emoji.

8. The apparatus according to claim 7, wherein the executed computer instructions further configure the one or more processors for:
selecting a mapping from the at least one mapping between the keywords and the emojis;
determining more than one emoji corresponding to one of the one or more matched keyword candidates based on the selected mapping;
highlighting any keyword candidate with the more than one corresponding emoji;
in response to a first selection operation on the highlighted keyword candidate, displaying an emoji list corresponding to the highlighted keyword candidate, wherein the emoji list includes the more than one corresponding emoji; and
in response to a second selection operation on an emoji from the emoji list, replacing the highlighted keyword candidate with the emoji selected from the emoji list.

9. The apparatus according to claim 7, wherein the executed computer instructions further configure the one or more processors for:
determining one emoji corresponding to one of the one or more matched keyword candidates based on the at least one mapping between the keywords and the emojis; and
replacing the keyword candidate with the determined emoji.

10. The apparatus according to claim 7, wherein the executed computer instructions further configure the one or more processors for:
detecting a trigger action by the user on the switch button that starts the emoji conversion function.

11. The apparatus according to claim 7, wherein the executed computer instructions further configure the one or more processors for:
presetting the one or more mappings between the keywords and the emojis based on emojis of a same color or a same cartoon character.

* * * * *